Sept. 8, 1970　　　　　P. H. MASON　　　　　3,526,925
CONVERTIBLE FISH CLEANING AND KITCHEN BOARD DEVICE
Filed April 16, 1968
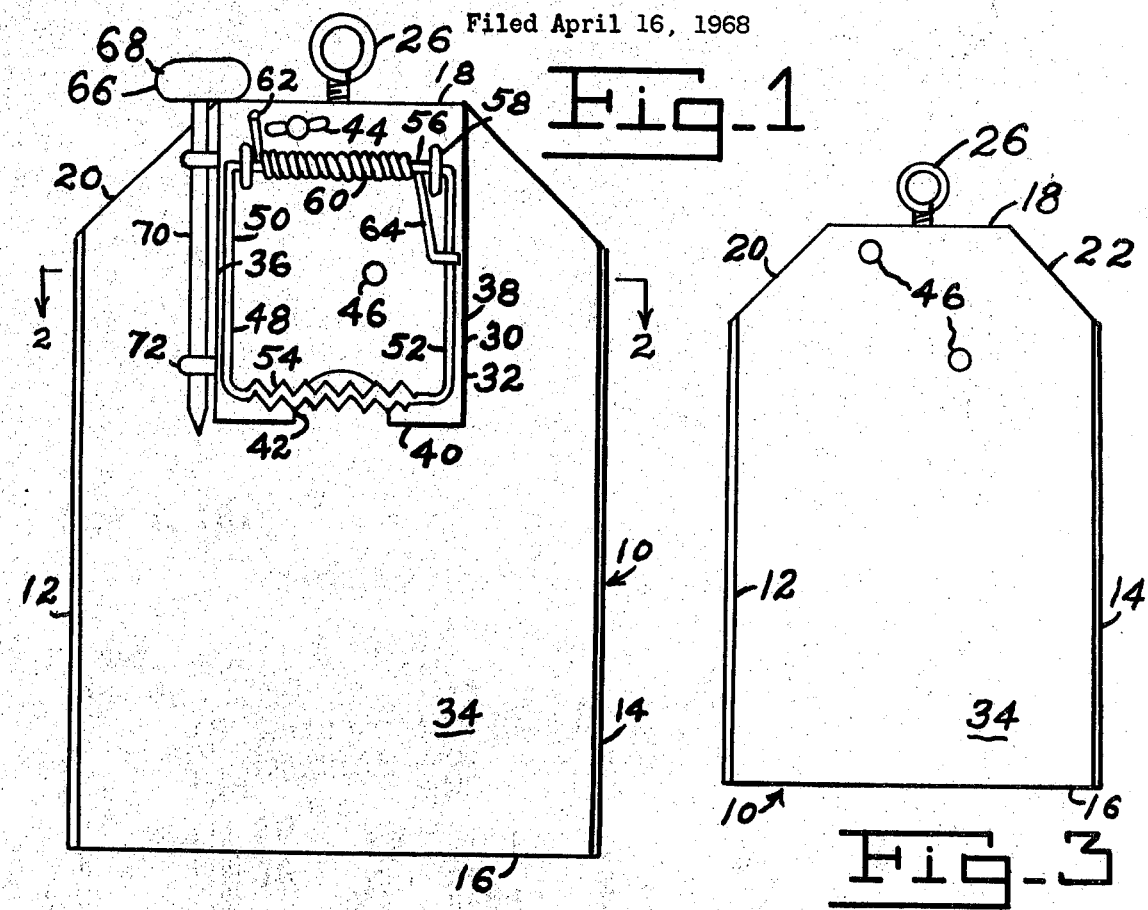
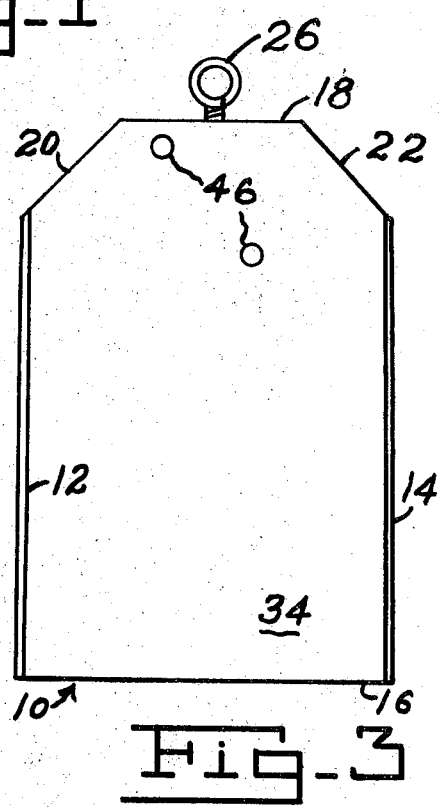
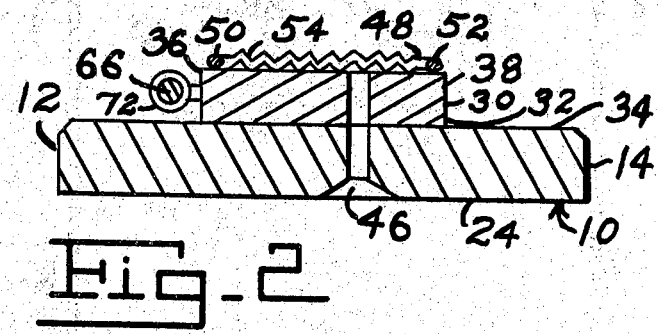
INVENTOR.
PAUL H. MASON

3,526,925
CONVERTIBLE FISH CLEANING AND KITCHEN BOARD DEVICE
Paul H. Mason, 166 Kenan St., Mobile, Ala. 36606
Filed Apr. 16, 1968, Ser. No. 721,820
Int. Cl. A22c 25/06
U.S. Cl. 17—70                    1 Claim

ABSTRACT OF THE DISCLOSURE

An all purpose kitchen utensil including a kitchen board with a fish cleaning device forming a removable part thereof. The cleaning device has a fish engaging clamp to hold the tail of the fish securely while being scaled and cleaned and there is a pointed awl for holding down the fish head to the board. The board is also otherwise usable for other kitchen purposes. The clamp portion is constructed to avoid multilation of the fish flesh.

---

This invention relates to improvements in kitchen board and fish cleaning devices and the like.

An object of the invention is to provide a novel and improved device in the nature of an all purpose kitchen board with a fish cleaning element carried thereon so that a fish to be cleaned may be securely engaged thereby.

Another object of the invention is to provide a novel and improved fish cleaning device which is removably secured to a kitchen board so that a fish to be cleaned and otherwise prepared can be supported lengthwise on the board and held firmly by head and tail while being scaled and cleaned.

A further object of the invention is to provide a novel and improved fish cleaning and kitchen utility device which is simple in design, is formed of few parts, and is very convenient for a variety of household uses.

Still another object of the invention is to provide a device of the type described, which can be made at low cost by mass production methods and by relatively unskilled labor.

These and other objects and advantages of the invention will become apparent from the following description thereof, as illustrated in the accompanying drawings, forming a part thereof, and in which:

FIG. 1 is a plan view of the complete device ready for use;

FIG. 2 is a sectional elevational view taken substantially on plane 2—2 of FIG. 1; and FIG. 3 is a plan view of the board device portion with the fish clamp portion removed.

In connection with the work in the kitchen it is frequently necessary to clean and scale fish, but this is difficult as the fish has to be usually intially grasped with both hands and then one hand has to be freed to wield a scaling knife, and cutting knife as needed. The present invention provides a convenient means for holding a fish securely, leaving one or both hands free to clean the fish, and without damaging the fish flesh. It includes a kitchen board upon which the fish is placed, and a tail clamp portion which can be detached by hand when the board is to be used separately, as well as a pointed head-engaging awl to hold the fish head down.

In order to understand clearly the nature of the invention and the best mode for carrying it out, reference may be had to the drawings in which like reference numerals denote similar parts throughout the several views.

As shown, there is a main body or base member 10, with beveled left and right side edges 12 and 14, a lower edge 16, and top edge 18. The top edge 18 may have angled shoulder portions 20 and 22. The bottom surface 24 of the main body member 10 is adapted to rest upon a table or other support, and the entire device may be hung by screw eye 26 when not in use, or to dry off. As thus far described it is usable as a kitchen board for a variety of purposes, such as cutting and trimming meats of all classes; cubing steaks; shaping sandwiches; cutting and chopping vegetables and fruits for salads. It thus prevents marring, scratching, cutting or mutilating either a wooden or metal table top.

The device also includes the fish engaging element 30 which is used to clamp and hold down a fish while being cleaned. As seen in FIGS. 1 and 2, the element or portion 30 has a panel or base portion 32, the lower surface of which rests upon the upper surface 34 of the main body 10. It has a smaller area than body 10, and has side edges 36 and 38, and lower edge 40, the latter edge having a finger receiving notch 42.

The fish engaging clamp portion 30 is secured in place by one or more wing screws 44 extending through aligned bores 46 formed through portion 30 and the main base board 10, which are removable by hand to separate the parts as needed. In order to clamp the tail of the fish, I provide on base 30, a clamping jaw member 48, with legs 50 and 52 interconnected at one end by serrated jaw portion 54 and at their upper ends by axle shaft portion 56, which is supported in bearings 58 driven into the auxiliary base 30.

A coil spring 60 extends around the axle shaft portion 56, and is so arranged that one end 62 bears downwardly against the body 30, while its other end 64 extends over and exerts resilient bias on leg 52 to force it toward body 30. The tail of the fish to be cleaned is inserted under clamp member 54 which is lifted by finger inserted in finger notch 42, and is firmly held thereby.

An awl member 66 with handle 68 has its shank 70 supported through screw eyes 72 driven into the edge 36 of auxiliary base 30, so that the awl member 66 is releasable for use in driving into and holding the head of the fish to the lower portion of the main base surface 34. The point of awl 70 may be made quite sharp for the purpose, such as like an ice pick point, or other suitable shape.

In use, the fish can be easily and quickly scaled and cleaned, and the head, being held to the board 34, is easily severed as desired, and the fish can be conveniently further cut up as needed. As all parts are washable, there is no problem in cleaning them off.

It is thus seen that the device provides an all purpose kitchen utensil which does not mutilate the fish flesh, and can be used for a variety of kitchen tasks.

Although a preferred embodiment of the invention has been described in specific terms, it is understood that various changes may be made in size, shape, materials and arrangement without departing from the spirit and scope thereof as claimed.

I claim:
1. A combination kitchen utensil comprising main base means in the form of a main board of substantial breadth and length for supporting a fish to be prepared and cleaned thereon, a clamp board of lesser area than said main board and overlying a portion thereof and releasably secured thereto, clamping means carried by said clamp board and constructed and arranged for clamping at one end fish and the like thereto, said clamping means including jaw means resiliently biased for clamping fish tails to said clamp board in a position such that the rest of the fish extends over said main board for support thereon for being cleaned, said clamping means further including a clamp shaft, bearing means supporting said shaft for rotation therein, leg means interconnecting said clamp shaft with said jaw means, and spring means for biasing said leg means and said jaw means toward said clamp board, said jaw means being serrated for securely engaging said fish tail without damaging the same, spearing means for holding outer end portions of said fish and the like to said main board, means on said clamp board for releasably supporting said spearing means, said spearing means including a sharp pointed awl the shank of which is removably seated in said support socket means when not in use, and is withdrawable therefrom for spearing head and body portions of a fish and the like to said main board during a cleaning operation.

References Cited

UNITED STATES PATENTS

| | | | |
|---|---|---|---|
| 2,435,075 | 1/1948 | Gould | 17—70 |
| 2,932,849 | 4/1960 | Missman | 17—70 |

OTHER REFERENCES

Popular Science magazine—March 1960, p. 160.

LUCIE H. LAUDENSLAGER, Primary Examiner